United States Patent [19]

Lewis

[11] Patent Number: 4,632,205

[45] Date of Patent: Dec. 30, 1986

[54] COMBINED GENERATOR AND BRAKE SYSTEM FOR LAND VEHICLES

[76] Inventor: Mike W. Lewis, P.O. Box 65, Stephenville, Tex. 76401

[21] Appl. No.: 531,712

[22] Filed: Sep. 13, 1983

[51] Int. Cl.⁴ .............................................. B60K 9/00
[52] U.S. Cl. ...................................... 180/165; 180/2.2
[58] Field of Search ..................... 180/2.2, 65.3, 165; 244/53 B; 290/45, 55

[56] References Cited

U.S. PATENT DOCUMENTS

| | | | |
|---|---|---|---|
| 3,444,946 | 5/1969 | Waterbury | 180/65 |
| 3,556,239 | 1/1971 | Spahn | 180/2.2 |
| 3,621,930 | 11/1971 | Dutchak | 180/65 R |
| 3,713,503 | 1/1973 | Haan | 180/65 R |
| 3,862,677 | 1/1975 | Bahr | 192/48.4 |
| 3,882,950 | 5/1975 | Strohlein | 180/54 R |
| 3,923,115 | 12/1975 | Helling | 180/165 |
| 4,075,545 | 2/1978 | Haberer | 320/61 |
| 4,237,384 | 12/1980 | Kennon | 290/55 |
| 4,254,843 | 3/1981 | Han | 290/55 |
| 4,276,951 | 7/1981 | Smitleg | 180/165 |

FOREIGN PATENT DOCUMENTS

514351 1/1940 United Kingdom .

Primary Examiner—John J. Love
Assistant Examiner—Richard M. Camby
Attorney, Agent, or Firm—Fleit, Jacobson, Cohn & Price

[57] ABSTRACT

A generator and brake systems for use with land vehicles. A freewheeling device is provided that allows a driven shaft to rotate at a speed greater than that of a driving shaft. A generator is associated with the drive shaft directly or with a shaft operatively associated with a driven shaft, and is selectively engageable with the driven shaft to generate electricity for operating components of the vehicle. A flywheel accumulates energy during braking or downhill coasting of the vehicle and a linkage is provided so that the flywheel is rotated when it is desired to brake rotation of the axle. Subsequently, the flywheel is disengaged from the shaft and rotates a generator that produces electricity to run components of the vehicle. Another generator is provided that is driven by air pressure encountered during movement of the vehicle and also when the vehicle is parked facing in the direction of a relatively strong wind. When it is desired to brake movement of the vehicle, a plate is extended to both oppose movement of the vehicle and to direct air into a passageway. Air directed into the passageway turns a generator. The generators can be used alone or in combination.

3 Claims, 16 Drawing Figures

COMBINED GENERATOR AND BRAKE SYSTEM FOR LAND VEHICLES

BACKGROUND OF THE INVENTION

1. Field of the Invention

The present invention relates to generator and brake systems for land vehicles, such as automobiles, trucks, and rail vehicles. More particularly, the invention relates to a combined generator and brake system usable with land vehicles to increase operating efficiency.

2. Summary of the Invention

The present invention provides a regenerative braking system and a freewheeling device for land vehicles powered by a heat engine or by an electric motor. The vehicle can also be a hybrid type of vehicle using any type of power transmission means. A freewheeling device uses the vehicle's inertia to generate energy which is stored by the generator-battery system of the vehicle. In a heat engine vehicle, the battery will power an electric motor which operates system components, such as an air conditioner, pumps, and a cooling fan. This allows the heat engine to run with only one belt for driving an alternator and an hydraulic pump as the freewheeling device allows the heat engine to coast. The engine will idle and vehicle will coast until the operator brakes the car to a speed at which the automatic neutral provided by the present invention reengages. The electric motor stops completely when connected to the transmission by the automatic neutral which will reengage at high speeds when the operator accelerates the engine (whether the electric or heat type) to a speed faster than the vehicle's coasting speed. As the vehicle begins to coast downhill at a speed faster than the speed limit, the operator will use any or all three regenerative braking devices to slow the vehicle and also to generate electricity.

The front and back axles are used to turn generators to save energy. The back axle is used to spin a free-spinning disc that turns a generator to recharge the battery. The front axle is selectively connected to a generator by the hydraulic brake system to generate electricity.

The invention also provides a generator for using windshield air that is forced into a venturi tube to turn a roller fan and genertor when braking is desired. When the car is parked, the forced air generator system can operate at a slow speed for long periods.

The invention, and its objects and advantages, will become more apparent in the detailed description of the prefered embodiments hereinafter presented.

BRIEF DESCRIPTION OF THE DRAWINGS

In the detailed description of the preferred embodiments of the invention hereinafter presented, reference is made to the accompanying drawings, in which.

DESCRIPTION OF THE PREFERRED EMBODIMENTS

The present description will be directed in particular to elements forming part of, corporating more directly with, the present invention. Elements not specifically shown or described herein are understood to be selectable from those known in the art.

Figure 1:
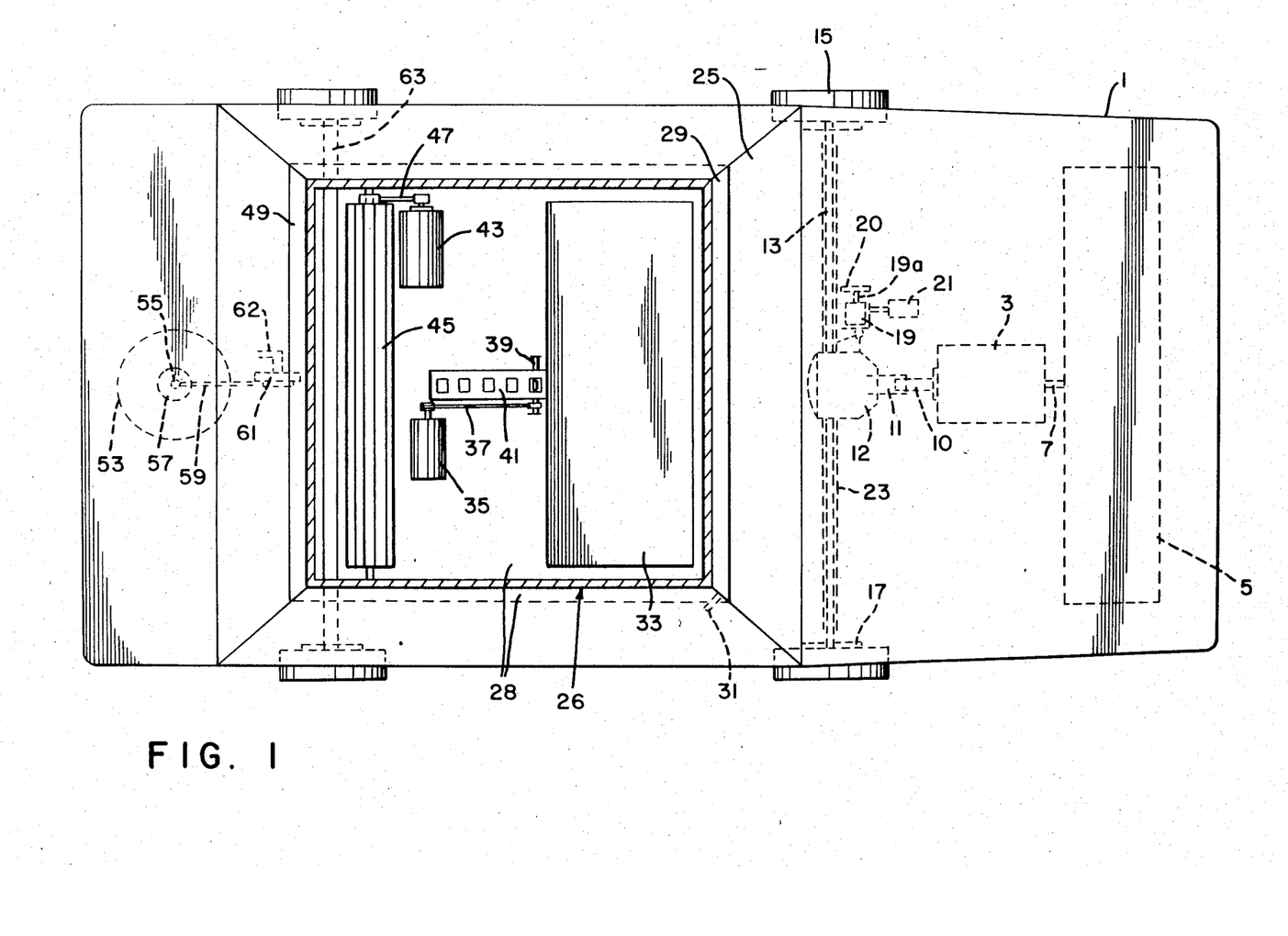
FIG. 1 is a schematic plan view of one embodiment of a vehicle according to the present invention, partially in section.

Referring now to the drawings, and particularly to FIG. 1, one embodiment of the present invention is illustrated as used in a powered land vehicle 1. Land vehicle 1 can be an automobile, a truck, or a rail vehicle, and it can be powered by an internal combustion (heat) engine, an electric engine, or a combination of an electrical and a heat engine. The engine is schematically represented at 3 and is connected with fuel tank 5, which can be of conventional construction. If the vehicle is powered by electric motor, fuel tank 5 as shown will be replaced by batteries located as close as possible to the electric motor 3, with a short conductor connection 7 to reduce resistance losses. The batteries are preferably housed on a rack (not shown) that can be lowered to the ground and rolled out from under the vehicle for maintenance.

Figure 9:
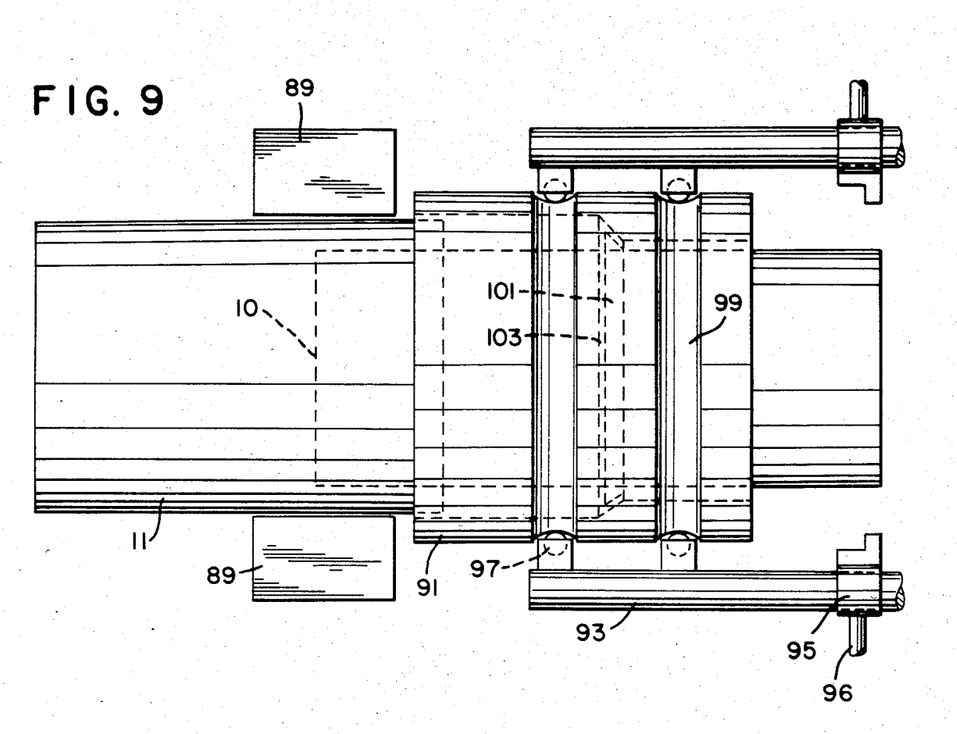
FIG. 9 is a side view of a modified freewheeling device usable in the vehicle illustrated in FIG. 1.
Figure 10:
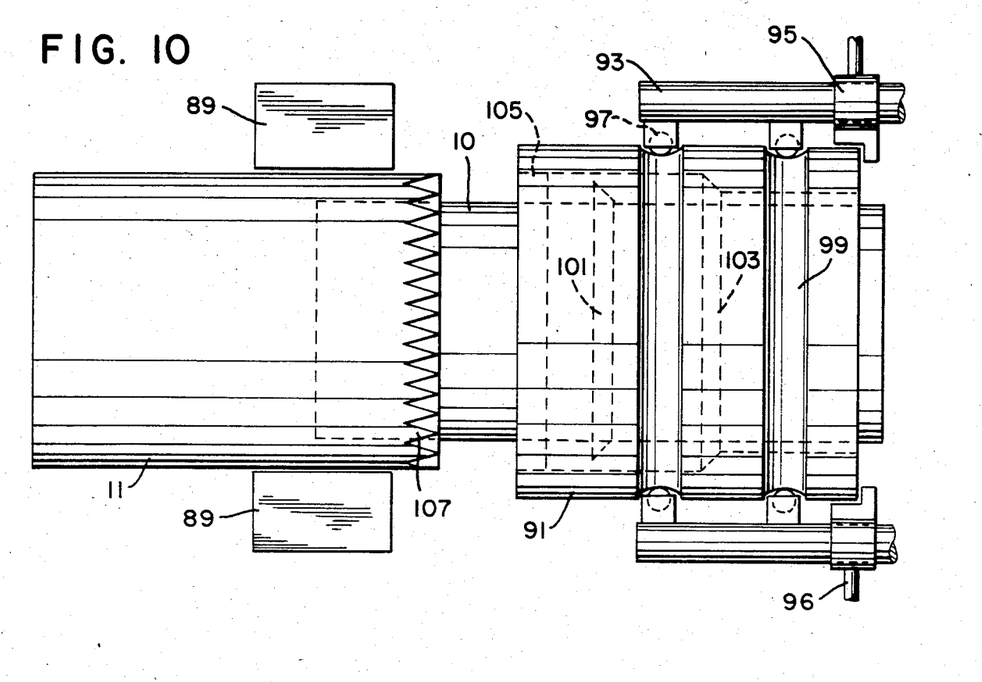
FIG. 10 illustrates the components of FIG. 9 in a different operating condition.

Vehicle 1 includes a power transmission 12, which can be an automatic transmission, a manual transmission, or an electric vehicle transmission with no reverse gear. A transmission with a reverse gear can be used with a heat engine. If the engine is electric it can be reversed to allow the vehicle to back up. If a freewheeling device, such as in the form of driving shaft 10 and driven shaft 11, as shown, is connected between the electric engine 3 and transmission 12, with a reverse gear, the freewheeling device can be used without an added locking device (such that as illustrated in FIGS. 9 and 10), to stop the freewheeling function and thereby allow the vehicle to back up. This would also be an advantage when used on a heat engine vehicle.

When the operator releases the accelerator, the heat engine idles while the electric engine stops completely. As the operator depresses the accelerator, the rotational speed of engine 3 (electric or heat) increases until it reaches the same R.P.M. as that of drive axle 13 and wheels 15. This will cause the freewheeling device 10 and 11 to reengage and allow the operator to increase the vehicle speed to that desired. When the freewheeling device 10 and 11 is used between engine 3 and a transmission 12 having a reverse gear, the engine 3 and device 10 and 11 always rotate in the same direction.

If an electric vehicle with a reversible engine is used instead of using a transmission with a reverse gear, a reversing cylinder, as illustrated in FIGS. 9 and 10, is added to the freewheeling devices 10 and 11 to selectively stop its freewheeling function.

The freewheeling devices 10 and 11, which acts as an automatic neutral allows the vehicle to coast which stops the engine 3 and allows the conventional disc brakes 17 to work better—because the freewheeling devices 10 and 11 causes the engine and spinning shafts to coast to a stop. The freewheeling devices causes the brakes to stop only the wheels and a short section of axle. Since the freewheeling devices 10 and 11 allows the car to coast to a stop and down a incline, the operator will need to brake more. This is an advantage because the wasted energy from braking can be used to turn a generator 19 which produces electricity for a battery. Generator 19 is affixed to the vehicle 1 on or near the transmission 12 so that it can be moved into contact with the drive axle 13 by means of hydraulic brake cylinder 21. Alternatively, the generator 19 can be directly engageable with the driven shaft 11. It should be appreciated that, broadly speaking, drive axle 13 is a driven shaft. Hydraulic brake cylinder 21 is connected to the conventional hydraulic system of the vehicle so the load imposed by generator 19 will help to brake the vehicle before added pressure from the operator causes the regular disc brakes 17 to engage. In one embodiment, generator 19 has a rubber wheel 20 connected at the end of the generator shaft 19a and makes contact with drive axle 13 through a suitable opening in drive axle outer housing 23. When the operator releases the brake pedal, the generator 19 returns to a position which disconnects the generator wheel 20 from the axle 13.

Figure 2:
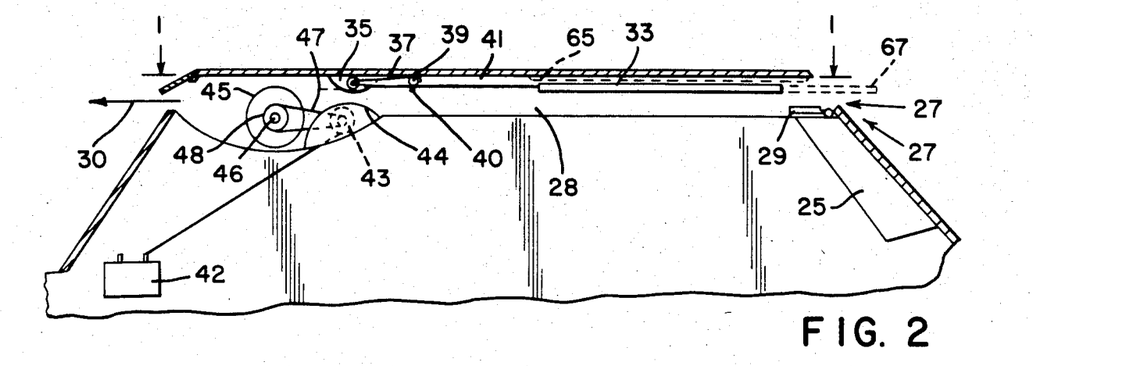
FIG. 2 is a fragmentary sectional view of a wind operated generator, as taken on line 2—2 of FIG. 3.

Refering to FIG. 2, air pressure acting on front windshield 25 resulting from forward motion of vehicle 1 is directed through air channel 28 extending along the roof of the vehicle from the front to the rear to turn roller fan 45, which turns generator 43 by means of belt 47. As the vehicle is coasting down an incline, the operator can slow the vehicle by operating lever 31 (see FIG. 1) to activate an electric motor 35 which drives belt 37 to open a plate means including an air inlet door 29 and an air plate 33. Motor 35 extends forces air plate 33 outwardly to capture and direct air into the inlet of air channel 28. When lever 31 is switched off, the motor 35 reverses to retract forced air plate 33 and close air inlet door 29. When the forced air plate 33 and air inlet door are returned to the off position, the electric motor is automatically cut off.

As motor 35 turns clockwise as viewed in FIG. 2, belt 37 turns a shaft that carries spur gear 39 which pushes rack 41 forwardly to extend air plate 33 out over front windshield 25. As air plate 33 starts moving outwardly, a gear (not shown) simultaneously opens the air inlet door 29. The same gear closes the air inlet door 29 as air plate 33 is retracted. After the air enters the air intake door 29 and under forced air plate 33, it flows through air channel 28 which directs it over fan 45 and then out air exit door 49. When the wind generator system is on, the air flow will pass through air channel 29 and over generator dust cover 44, which acts as a venturi section to increase the velocity of the air passing through the air channel. Electric motor 35 also has a dust cover which works with the other venturi section to increase air flow before air reaches the fan 45. Fan 45 is mounted on shaft 46, which also supports pulley 48.

Forced air plate 33 includes wheels (not shown) to allow it to be rolled along roof 65 in and out of air channel 28. The forced air plate 33 forces extra air into air channel 28 to generate more electricity and to produce more braking power than with conventional systems. Electric motor 35 turns clockwise to turn belt 37 which turns the shaft supporting spur gear 39 to extend rack 41 and plate 33. Inlet air shown by arrow 27 enters the front of the vehicle through door 29, turns fan 45, and leaves through large door 49, as shown by arrow 30. The air passes through an appropriate venturi section 44 and over fan 45 before leaving the vehicle. Fan 45 turns belt 47 turning generator 43 to recharge auxiliary battery 42 on heat engine vehicles or the main battery (not shown) on electric vehicles. The fan system is designed to brake the vehicle while in motion, or to generate electricity for periods of time while the vehicle is parked facing into the wind.

Figure 3:
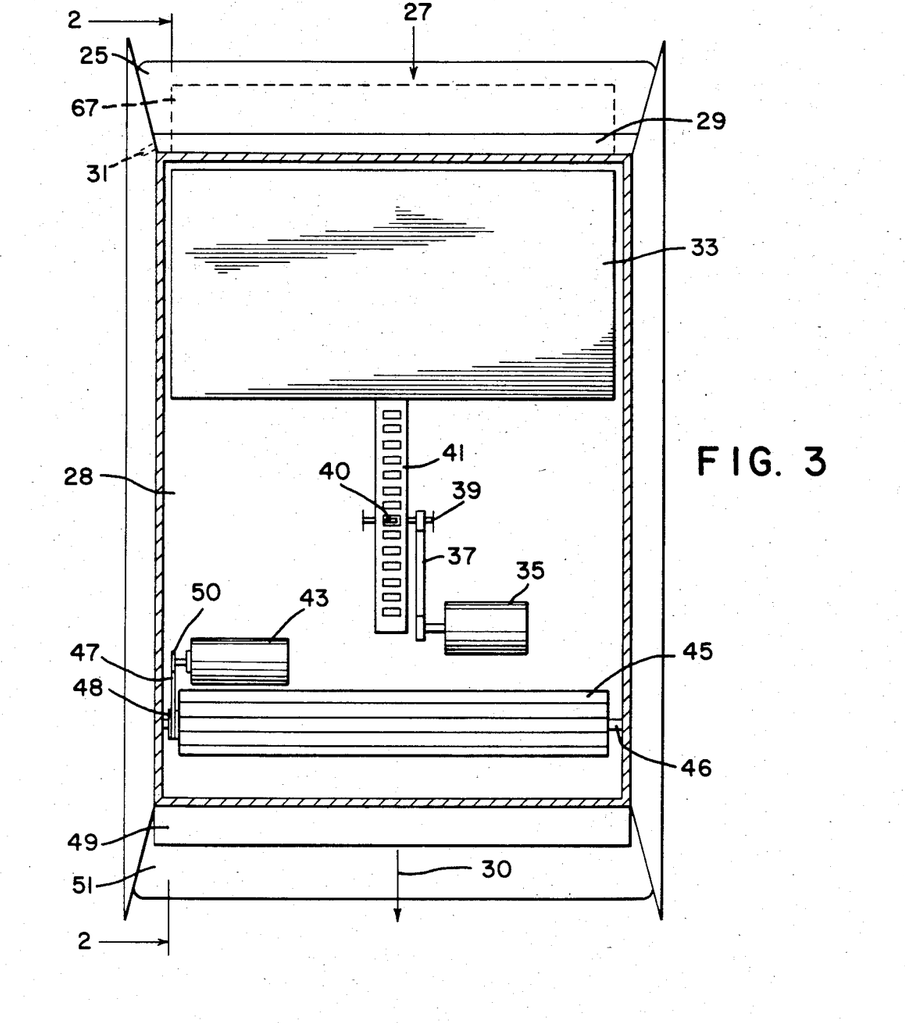
FIG. 3 is an enlarged sectional view along line 3—3 of FIG. 2.

As illustrated in FIG. 3, a pulley 50 connected to the shaft of generator 43 is turned by belt 47 driven by fan 45 adjacent the back window 51 of the vehicle. The control switch 31 of the wind generator system is close to the air inlet door 29, which is shown closed in FIG. 3.

Figure 4:
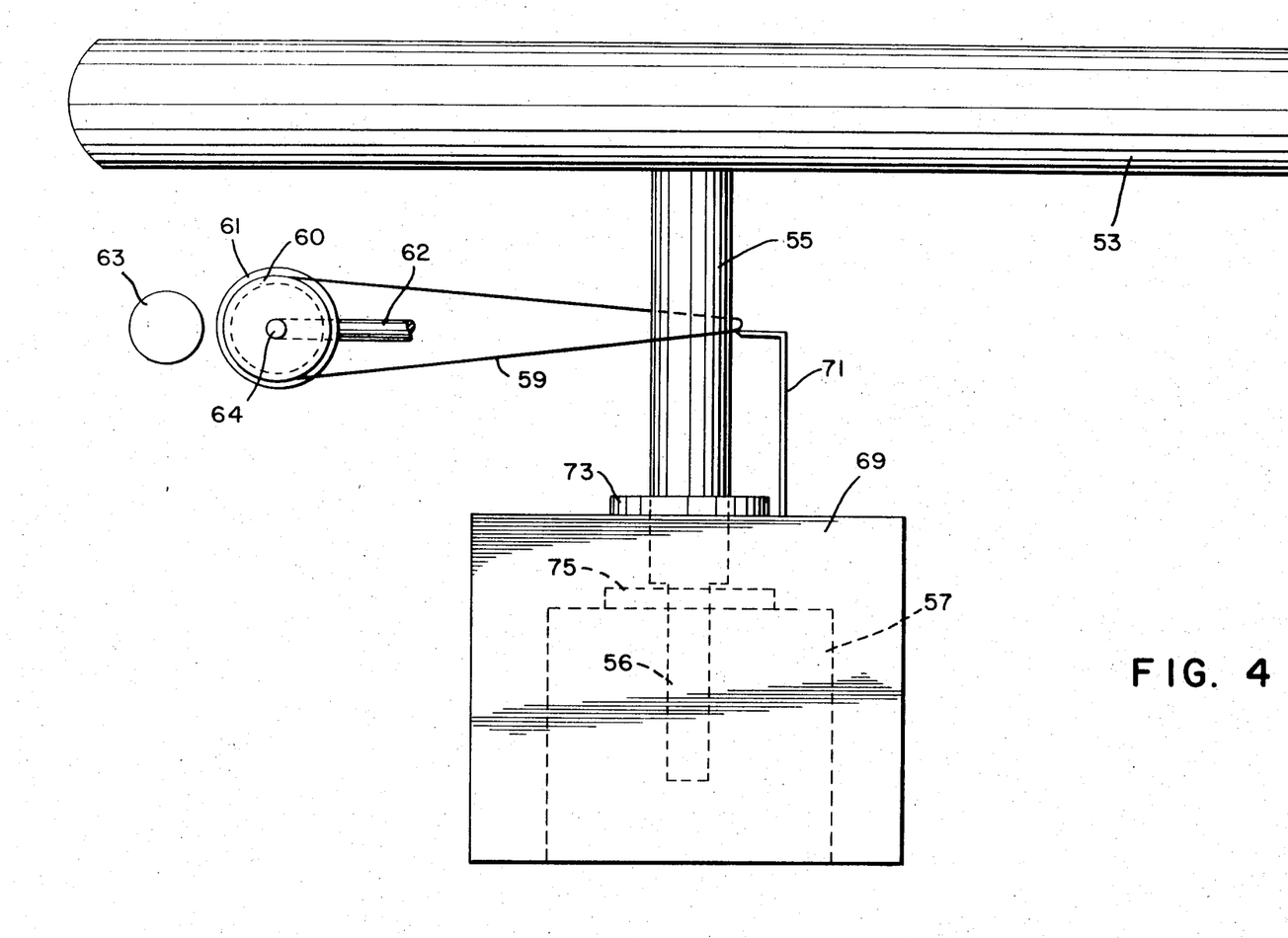
FIG. 4 is an enlarged side view of a portion of the vehicle illustrated in FIG. 1.

Refering now to FIG. 4, inertia disc 53 and generator 57 are illustrated on an enlarged scale. Disc 53 is connected with generator 57 by disc axle 55, which is rotatably supported in bearing case 75. Support and dust cover 69 also has a bearing case 73 to support disc axle 55. Disc axle 55 has the generator armature 56 connected thereto to be turned directly by the disc axle 55. As the disc 53 spins, generator 57 produces electricity, which causes disc 53 to eventually stop after free-spinning for a short period. After disc 53 stops (or slows down), it can be used again to brake the vehicle.

Cover 69 supports arm 71, which supports power belt 59. As the operator begins to press a disc pedal (not shown) to brake the vehicle, the tensioner 61 is moved by shaft 62 and bearing 64 into contact with the vehicle's coasting axle 63 (usually in the back of the vehicle). As tensioner 61 makes contact with vehicle axle 63, it gradually tightens disc belt 59 around small tensioner wheel 60 and disc axle 55. This allows the vehicle to brake while its inertia is stored in the spinning disc 53 which is quickly slowed down by generator 57 which recharges battery 5. The disc pedal (not shown) which operates lever 62 works in the same manner and is positioned the same as a standard transmission clutch pedal. A simple manual lever connected to the disc pedal moves shaft 62 along a rail (not shown) supported by the vehicle frame until contact is made with vehicle axle 63. As the pedal is depressed while the vehicle is moving forward, the tensioner 61, belt 59, and disc 53 will be set in motion, which brakes the vehicle. As the disc pedal is released, the tensioner 61 is disengaged from axle 63 and the power belt 59 relaxes and rests on arm 71, which allows disc 53 to spin freely while generator 57 slows down the disc to be used the next time the operator wishes to brake the vehicle. Axle 63 can be used with a series of discs which will allow the vehicle to brake with more than one disc down a long incline.

Disc 53 is not designed to spin at very high R.P.M's, or for long periods. It can be operated with or without a vacuum system. Using the disc 53 without a vacuum system will be a simple energy efficient system. Disc 53 will slow the vehicle and spin for a short period of time because generator 57 will eventually stop disc 53. As the operator pushes in on the disc pedal the tensioner 61 is pushed into contact with the back axle 63 by a manual lever 62. The tension of belt 59 can be adjusted by the setting of the lever 62 connected to the tensioner 61. Rear axle 63 connects the rear wheels, which preferably each have an independent suspension (not shown) so that the axle will spin and stay stationary and not bounce with the wheels. As tensioner 61 makes contact with the rear axle, it tightens the disc belt 59 around a smaller wheel 60 on the tensioner 61 and around disc shaft 55. As the rear axle 63 and the tensioner 61 turn, the belt 59 will slip on the smaller wheel 60 and on the disc shaft 55. As more pressure is put on the disc pedal by the operator, the tensioner 61 and the belt 59 will make better contact with the small tensioner wheel and the disc shaft 55, which causes the vehicle to slow as it spins the disc 53 faster. When the disc pedal is released, the tensioner retracts and disconnects from the rear axle 63 and causes the disc belt 59 to relax, allowing the disc to spin freely.

When the disc is spinning, it is directly turning the generator 57. Disc 53 can be positioned on the rear axle 63 or on the front axle 13 and has a connection that diverts the electricity from the generator 57 directly to the electric motor 3 when a meter (or accelerator sensor) senses the operator accelerating. This will give the engine more current since the electrical charge will be added to the electric charge coming from the battery 5. The meter (accelerator sensor) will allow more charge to flow to the engine when the engine is moving the car from a standstill, or when the operator is going up a hill or passing another vehicle. The disc 53 stores the inertia which is increased by the freewheeling devices 10 and 11. As the vehicle is stopped in traffic, the disc will recharge battery 5. When the operator accelerates, the accelerator sensor or meter directs the charge to the electric motor 3 on electric vehicles; or to an auxiliary electric motor (or motors) used on heat engine vehicles to operate system components, such as an air conditioner, pumps, and a cooling system. When the generator system is used on any land vehicle, the operator will recharge the main battery or auxiliary battery before starting on a journey.

Figure 5:
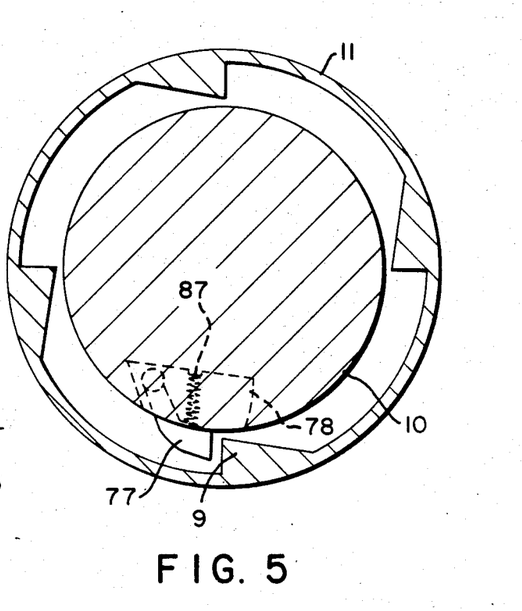
FIG. 5 is a view on line 5—5 of FIG. 6.
Figure 11:
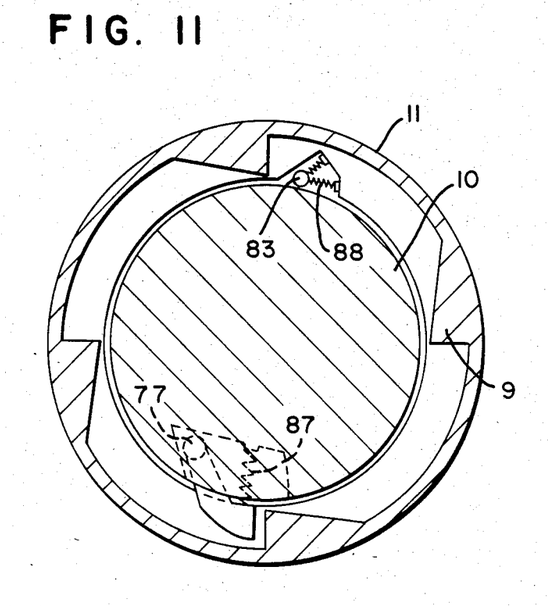
FIG. 11 is a view along line 11—11 of FIG. 14.

Referring now to FIG. 5, the characteristics of the freewheeling devices 10 and 11 will be explained. Part 11 of the automatic neutral or freewheeling device is the larger driving shaft which has teeth 9 machined on the inside diameter of a drilled hole. The teeth 9 are flat on one side to engage pin 77 on smaller, driven shaft 10. The teeth 9 are long, running horizontally of the shaft so that the smaller shaft 10 can be inserted 3 to 4 inches into the drilled hole. The teeth 9 are angled on one side so that they push down on pin 77 of the inserted smaller shaft 10. Pin 77 is biased outwardly by spring 87 positioned in a cavity 78 in shaft 10. As an operator releases the accelerator pedal, the engine driving power is released so that the shaft 11 can rotate with the wheels of the vehicle and gain speed on an incline, without connection to the motor. Several devices 10 and 11 can be used at different places on the drive train of a land vehicle having an electric or a heat engine with a standard transmission, an automatic transmission, or an electric car transmission without a reverse gear. If the vehicle is an electric vehicle and uses the reverse function of the transmission instead of reversing the engine, the automatic neutral 10 and 11 can be used without the reverse cylinder shown in FIGS. 9 and 10. Automatic neutral can be made with a ratchet pin binding device (FIGS. 5 and 6) or a roller bearing binding device (FIGS. 7 and 8) or a combination of the two shaft binding methods, as shown in FIG. 11.

A first freewheeling device 10 and 11 can be located between the engine and the transmission of heat engine vehicles and electric engine vehicles without a reversible engine. In this position, the devices 10 and 11 can be used as shown in FIGS. 5 to 8. A reverse cylinder, as illustrated in FIGS. 9 and 10, is used on heat engine vehicles only if a device 10 and 11 is positioned on the drive shaft or the power axle beyond the transmission. The device 10 and 11 will work better the closer it is positioned to the wheels. A reverse cylinder will also need to be used when a device 10 and 11 is placed between a reversible electric engine and the transmission. This will allow the operator to selectively connect the shafts of two devices 10 and 11 for reversing. With any type of engine using the device 10 and 11 beyond the transmission, the reverse cylinder (FIGS. 9 and 10) will have to be used to stop the freewheeling function of the device 10 and 11 for reversing the vehicle.

Figure 6:
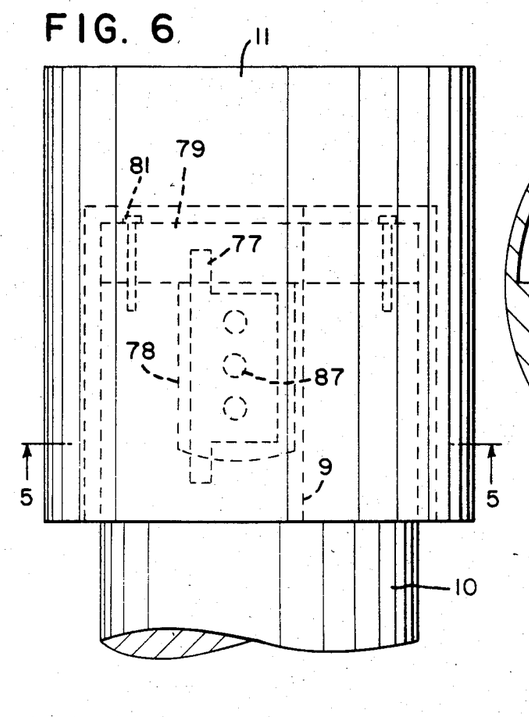
FIG. 6 is a top view of the structure illustrated in FIG. 5.

As illustrated in FIG. 6, bolts 81 are used to connect cap 79 to end of shaft 10. The cap 79 secures the ratchet pin 77 by a bushing in a pin axle hole in cap 79, which allows ratchet pin 77 to pivot toward and away from member 11 as the vehicle is coasting.

Figure 7:
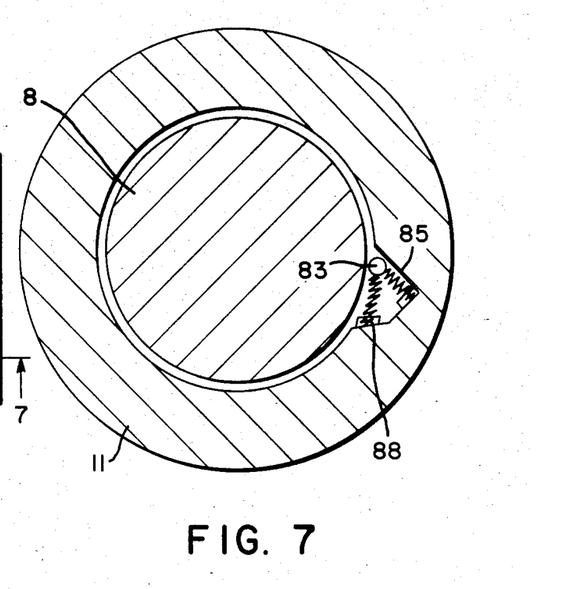
FIG. 7 is a side view taken along line 7—7 of FIG. 8.
Figure 8:
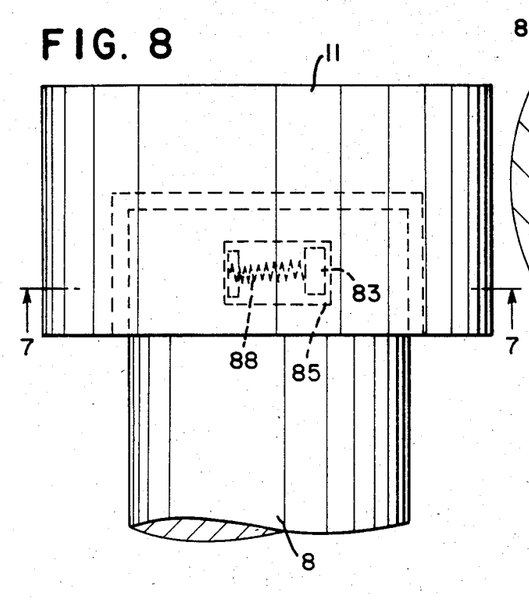
FIG. 8 is a top view of the structure illustrated in FIG. 7.

FIGS. 7 and 8 illustrate the use of a roller bearing to provide a binding method for the device 10, 11. Larger shaft 11 has a hole machined in the center of the shaft. Shaft 10 has a smaller diameter than the hole in shaft 11 so it can be received therein. Shaft 11 has a cavity machined in it to anchor springs 88 to push roller bearing 83 in contact with angled wall 85 of a cavity cut in shaft 11 and shaft 10. As shaft 10 turns counterclockwise, the springs 88 urge roller bearing 83 into the small space between shaft 10 and shaft 11. This causes the roller bearing to lock shafts 10 and shaft 11 together and connects the engine and drive train so that the vehicle can gain speed. As the drive train speed increases, the speed of shaft 11 increases while shaft 10 is allowed to slow down with the engine.

FIG. 9, illustrates a freewheeling device that uses shaft binding devices of the type illustrated in FIG. 5 to 8. Such device uses a reverse cylinder to stop the freewheeling function so that the vehicle can back up when the device is positioned beyond the reverse function of vehicle. With the automatic neutral beyond the the transmission (electric or heat engine), the reverse cylinder will have to be used to reverse the vehicle. Bearing case 89 is used to keep shafts 10 and 11 in the desired alignment. Reverse cylinder 91 is shown connected to both shaft 10 and shaft 11. Cylinder 91 has internal teeth which mate with complementary shaped external teeth on shaft 11, and accepting teeth 103 to connect with gear and teeth 101 on shaft 10. When all teeth are engaged, the device is connected so that the operator can reverse the vehicle.

Cylinder 91 is engaged and disengaged by arms 93 connected to cylinder 91 by bearing socket and bearings 97. Arm 93 is movably received in brace 95, which is held by support arm 96 connected to the vehicle frame. Arm 93 slides back and forth in brace 95 which holds cylinder 91 in a retracted position so that it does not contact any part of the device 9, 10. Bearing socket and bearing 97 fit inside grooves 99 machined in cylinder 91. As the operator engages a reverse lever, arm 93 is moved toward shaft 11 and makes contact with cylinder 91 at groove 99 when bearing socket and bearing 97 push against the walls of groove 99. The bearings 97 allow the cylinder 91 to rotate with shafts 10 and 11 after arm 93 had pushed the teeth of cylinder 91 into engagement with the teeth on shafts 10 and 11. After the operator reverses the vehicle, the reverse lever will be turned off, which moves cylinder 91 out of engagement with shafts 10 and 11 to a position on brace 95 where it is not touching shaft 10. Cylinder 91 can only be connected or disconnected when both shafts 10 and 11 have stopped spinning.

FIG. 10 is a side view of shaft 10 and 11, with cylinder 92 disengaged and held by brace 95. All the parts shown are the same as FIG. 9, except that FIG. 10 illustrates the teeth 107 on shaft 11.

The free-wheeling device allows the heat engine and the electric engine to run at a cooler temperature while the vehicle is coasting because high air pressure is naturally pushed over the engine while in motion. Also, on vehicles equipped with cruise control, the cruise control device will require adjustment to keep the engine speed from increasing too rapidly while coasting, just before the drive axle re-engages with the driven axle at the free-wheeling device.

Referring now to FIG. 11, the automatic neutral 9, 10 is illustrated with the shaft binding methods of FIGS. 5 to 8 combined in one device. The combination of the binding devices is done to make the automatic neutral stronger. Also, it allows shaft 11 to slow down before ratchet pin 77 hits teeth 9 on shaft 11. Shaft 10 contains ratchet pin 77 and springs 87. Shaft 11 contains roller bearing 83 and springs 88.

Figure 12:
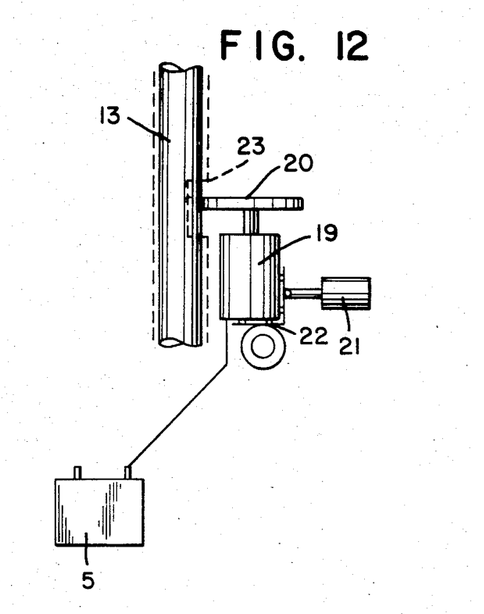
FIG. 12 is an enlarged schematic representation of a portion of the vehicle of FIG. 1.

FIG. 12 shows a generator system in which a generator is driven by power axle 13 when the operator presses the brake pedal (not shown). As the operator pushes the brake pedal harder, the regular disc brakes take over to stop the vehicle faster. Axle 13 is exposed by a cut section in axle housing 23. Generator 19 has a rubber wheel 20 affixed at the end of the generator shaft. As the brakes are applied, the hydraulic cylinder 21 pushes generator wheel 20 into contact with axle 13 which turns generator 19 to recharge the battery 5. Generator 19 is swiveled by axle and brace 22. As the brake pedal is released, a spring (not shown) pulls generator wheel 20 out of contact with axle 13.

Figure 13:
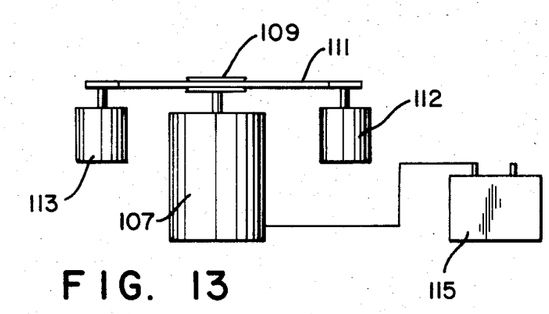
FIG. 13 is a schematic representation of a modification of the vehicle of FIG. 1.
Figure 14:
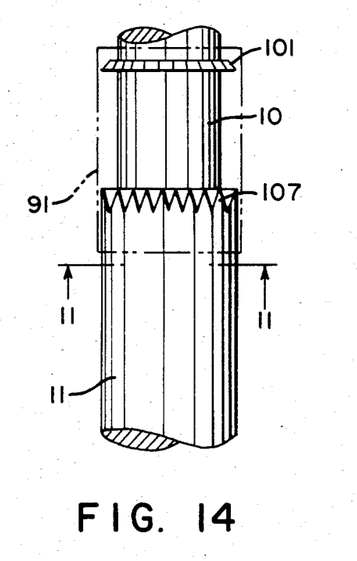
FIG. 14 is a top view of the device illustrated in FIG. 11.

FIG. 13 illustrates an electric motor 107 used on heat engine cars to drive the existing belt systems and free the engine to the job of moving the vehicle. The alternator and the hydraulic pump can still be powered by the heat engine. The electric motor uses energy stored in battery 115, which is added to the vehicle and recharged by the generator system 19 described above and shown in FIG. 12. Electric motor 107 turns pulley 109, which turns belt 111 to drive air conditioner compressor 113 and coolant pump 112. A radiator fan also can be driven by belt 111, if desired. Use of motor 107 allows the heat engine to be more energy efficient.

Figure 15:
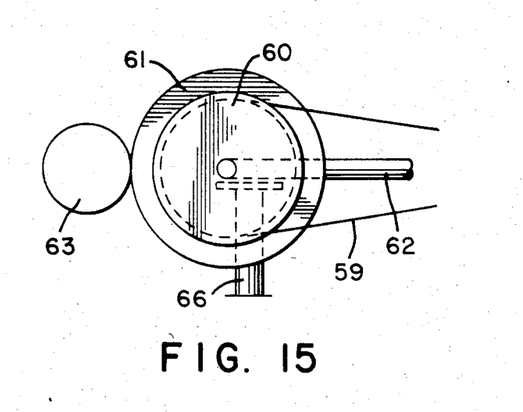
FIG. 15 is an enlarged view of a portion of the vehicle illustrated in FIG. 1.

FIG. 15 is an enlarged view of the tensioner 61 of FIG. 1, when connected to the coasting axle 63. Tensioner 61 is a rubber wheel supporting a smaller wheel 60. Wheel 60 drives belt 59 as pressure is applied to shaft 62 to move tensioner 61 toward axle 63. Tensioner 61 makes contact with axle 63 while it tightens belt 59 around a disc axle (not shown) and around the smaller tensioner wheel 60. Brace 66 is connected to the vehicle frame and has bearings (not shown) to allow sliding of shaft 62.

Figure 16:
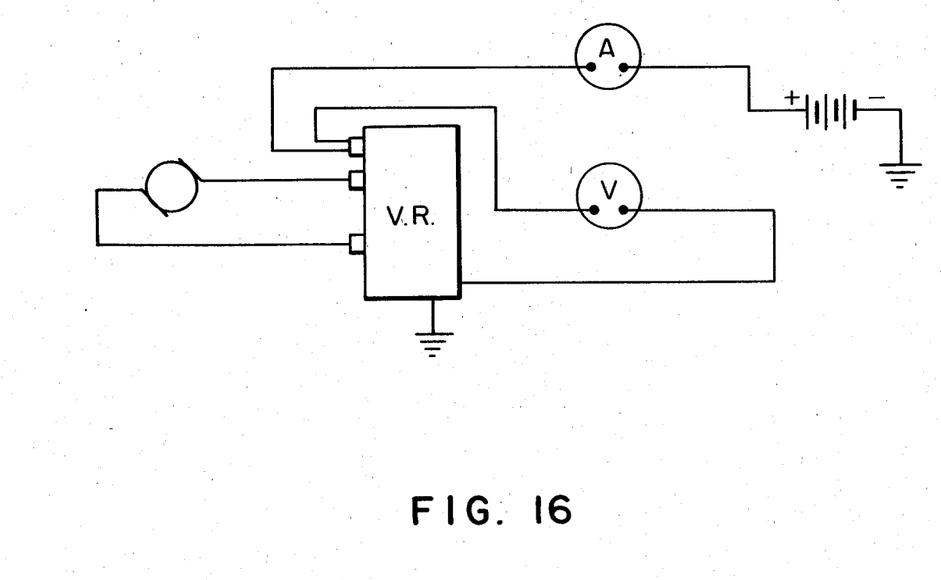
FIG. 16 is a schematic wiring diagram of an electrical system according to the present invention.

Referring now to FIG. 16, a schematic wiring diagram suitable for use with the present invention is illustrated, although that diagram is illustrative only and other arrangements can be employed, if desired. "V.R." is a voltage regulator which can direct electricity to the electric motor 107 of FIG. 13 or the drive motor in electric vehicles. V.R. is responsive to an accelerator position sensor to detect when the operator is accelerating so that extra voltage can be provided in addition to that from the battery. This allows the energy to be used directly and without first storing it.

The invention does not completely recharge the batteries while the vehicle is in motion and therefore a full charge should be made before long trips. Each generator and the automatic neutral can be used in several different locations on the vehicle.

Specific embodiments of the present invention have been illustrated and described. It should be appreciated, however, that these embodiments have been described for the purposes of illustration only, without any intention of limiting the scope of the present invention. For instance, a bearing case 89 (see FIGS. 9 and 10) will be needed on both shafts of the freewheeling device 10 and 11 when the device is used beyond the transmission on the drive train. Two freewheeling devices can be used on the drive axle near each of the drive wheels, along with reverse cylinders of the type illustrated in FIGS. 9 and 10. It also should be appreciated that the present invention can be used with either front wheel or rear wheel driven vehicles, and can also be used with rail vehicles and trailers. Most of the parts can be made of aluminum or other light weight metals. The belts used on the invention can be made with materials other than rubber, and no new methods of production will be needed to produce parts for the invention. The parts of the braking devices can be connected or disconnected by other simple devices not shown or described. Further, individual components, rather than all of the previously described components, can be incorporated in a vehicle. Thus, the intention is that the present invention be limited only by the appended claims.

What is claimed is:

1. A combined generator and brake system for use with land vehicles comprising:

means for defining an air channel extending from the front to the rear of the vehicle;

door means for closing an inlet end of the air channel so as to minimize air resistance of the vehicle, said door means having an inlet door at an opening at the inlet of said air channel end;

a movable plate positioned for movement through the opening to said air channel;

means for opening said door means and for moving said movable plate from a retracted position to an extended position, said movable plate in the extended position exerting a braking force on the vehicle and directing air into the inlet end of the air channel; and     generator means associated with said air channel for generating electricity from the movement of air through said air channel.

2. A combined generator and brake system in accordance with claim 1 wherein said system further includes a driving shaft and a driven shaft comprising:

a freewheeling device for interconnecting said driving shaft and said driven shaft so that the wheels of the vehicle are driven by rotation of the driving shaft when the driving shaft is rotating at a speed greater than that of the driven shaft, said freewheeling device interconnecting said driving shaft and said driven shaft in such manner that the driven shaft is rotatable at a higher rate of speed than the driving shaft, the driven shaft being operatively linked with wheels of the vehicle so that when the vehicle is coasting the driven shaft is rotatable by rotation of the wheels at a greater speed than the speed of rotation of the driving shaft;

generator means selectively engageable with the driven shaft for generating electricity from rotation of said driven shaft; and means for engaging said generator means with the driven shaft during a vehicle braking operating so that generator means assists in braking the vehicle while simultaneously generating electricity.

3. A combined generator and brake system in accordance with claim 1 wherein the vehicle includes a drive shaft for driving the wheels of the vehicle, and having a braking system, further comprising:

engagement means selectively engageable with the drive shaft of the vehicle upon actuation of the vehicle braking system for opposing rotation of the drive shaft to thereby assist in a braking operation;

means for moving said engagement means into contact with the drive shaft upon actuation of the vehicle braking system;

flywheel means;

means for connecting said flywheel means with the drive shaft through said engagement means so that the flywheel means is rotated when said engagement means engages the drive shaft;

means for selectively linking said flywheel means with said engagement means so that said flywheel means is rotated when said engagement means is in engagement with the drive shaft, whereby the rotational energy of the drive shaft is used to rotate the flywheel means, said flywheel means being disengaged from said engagement means when rotation of the drive shaft stops; and generator means operatively associated with said flywheel means for generating electricity when said flywheel means is rotating.

* * * * *